(12) United States Patent
Brand et al.

(10) Patent No.: US 11,539,275 B2
(45) Date of Patent: Dec. 27, 2022

(54) DYNAMOELECTRIC ROTARY MACHINE WITH ELEMENTS FOR REDUCING TONAL NOISES

(71) Applicant: SIEMENS AKTIENGESELLSCHAFT, Munich (DE)

(72) Inventors: Jens Brand, Nuremberg (DE); Andreas Gruenthaler, Nuremberg (DE); Mario Krebs, Greding-Hausen (DE); Thomas Schmidt, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 690 days.

(21) Appl. No.: 16/516,293

(22) Filed: Jul. 19, 2019

(65) Prior Publication Data
US 2020/0028418 A1 Jan. 23, 2020

(30) Foreign Application Priority Data
Jul. 19, 2018 (EP) .................................... 18184500

(51) Int. Cl.
*H02K 3/28* (2006.01)
*H02K 15/06* (2006.01)
*H02K 17/16* (2006.01)

(52) U.S. Cl.
CPC ............ *H02K 15/061* (2013.01); *H02K 3/28* (2013.01); *H02K 17/16* (2013.01); *H02K 2201/03* (2013.01); *H02K 2205/12* (2013.01)

(58) Field of Classification Search
CPC ...... H02K 17/165; H02K 3/28; H02K 15/061; H02K 17/16; H02K 2201/03; H02K 2205/12
See application file for complete search history.

(56) References Cited

U.S. PATENT DOCUMENTS 3,043,969 A * 7/1962 Petersen ................ H02K 9/223
310/260
4,796,353 A 1/1989 Mantovani
(Continued)

FOREIGN PATENT DOCUMENTS

DE 0903833 A1 * 3/1999
EP 0269558 A2 6/1988
(Continued)

OTHER PUBLICATIONS

EP-0903833-A1 machine translation Jun. 10, 22.*

*Primary Examiner* — Leda T Pham
(74) *Attorney, Agent, or Firm* — Laurence A. Greenberg; Werner H. Stemer; Ralph E. Locher

(57) ABSTRACT

A dynamoelectric rotary machine includes a stator, which has a winding system arranged in grooves disposed between teeth of a magnetically conductive body and a winding head on the end faces of the stator in each case. A rotor with a cage ring is arranged rotatably about an axis and during operation of the dynamoelectric rotary machine is in electromagnetic interaction in a motor-driven or generator-driven manner with the winding system of the stator arranged in the grooves by way of an air gap. Comb-type elements are disposed on the end faces of the stator. The comb-type elements assume an extensive intermediate space between the winding system projecting from the end faces of the stator, so that tonal noises which are produced during operation of such an electric machine are at least reduced.

4 Claims, 4 Drawing Sheets

(56) References Cited

U.S. PATENT DOCUMENTS

| | | | |
|---|---|---|---|
| 9,160,215 B2* | 10/2015 | Brown | H02K 11/20 |
| 10,630,127 B1* | 4/2020 | Thomasson | H02K 3/505 |
| 2007/0170806 A1* | 7/2007 | Haldemann | H02K 3/42 |
| | | | 310/260 |

FOREIGN PATENT DOCUMENTS

| | | |
|---|---|---|
| EP | 0903833 A1 | 3/1999 |
| GB | 2239128 A | 6/1991 |
| JP | H07288944 A | 10/1995 |
| JP | 2012039798 A | 2/2012 |

* cited by examiner

DYNAMOELECTRIC ROTARY MACHINE
WITH ELEMENTS FOR REDUCING TONAL
NOISES

CROSS-REFERENCE TO RELATED APPLICATION

This application claims the priority, under 35 U.S.C. § 119, of European patent application EP 18184500.9, filed Jul. 19, 2018; the prior application is herewith incorporated by reference in its entirety.

BACKGROUND OF THE INVENTION

Field of the Invention

The invention relates to a dynamoelectric rotary machine with elements for reducing tonal noises and a method for producing a stator of such a dynamoelectric rotary machine.

With air-cooled rotary dynamoelectric machines, as well as with open-circuit ventilated rotary dynamoelectric machines, noise caused by an air flow is frequently a critical variable. One of the typical causes of sound generation can be found in the active part of these machines, in other words in the stator and/or rotor.

Therefore, in asynchronous machines with squirrel cage rotors in particular, in which the cage ring does not rest directly against the end face of the rotor laminated core, this distance between the interior of the cage ring and the end face of the rotor laminated core is a particularly critical location. During operation of the dynamoelectric rotary machine, this results in aeroacoustic interactions between the winding coils of the winding system emerging on the end face of the stator and the rods of the rotor. The rods of the rotor rotating rapidly past the vertical winding coils of the stator result in pressure fluctuations, which induce tonal noises.

SUMMARY OF THE INVENTION

On this basis the object underlying the invention is to create a stator or a stator-rotor arrangement of a dynamoelectric machine, which reduces or prevents these sound emissions.

The solution to the set object is achieved by a dynamoelectric rotary machine containing:
  a) a stator, which has a winding system arranged in the grooves disposed between teeth of a magnetically conductive body and which in each case has a winding head on the end faces of the stator;
  b) a rotor with a squirrel cage, which is arranged rotatably about an axis and during operation of the dynamoelectric rotary machine is in electromagnetic interaction in a motor-driven or generator-driven manner with the winding system of the stator arranged in the grooves by way of an air gap; and
  c) comb-type elements on the end faces of the stator, which assume an extensive intermediate space between the winding system projecting from the end faces of the stator, so that tonal noises, which are produced during operation of such an electric machine, are at least reduced.

The solution to the set object is also achieved by a method for producing a stator of an inventive dynamoelectric machine, by means of the following steps:
  a) producing a magnetically conductive body, which has a yoke rear with teeth pointing radially inward and grooves located between these teeth;
  b) attaching elastic elements to the end faces of the magnetically conductive body, the shape of which corresponds essentially to the cross-sectional shape of the magnetically conductive body;
  c) placing a winding system into grooves of the magnetically conductive body; and
  d) impregnating and curing the magnetically conductive body with winding system and elastic elements, wherein in the process the elastic property of the elements gets lost and a robust, essentially cylindrical surface is thus produced by the sequence of the winding system projecting from the end faces of the magnetically conductive body and the elements.

As a result of the inventive attachment of elements to the end faces of the magnetically conductive body, which is embodied as a stator laminated core or preferably as a single-piece sintered stator, there is now in particular no longer any radial intermediate space between the winding coils of the stator for the air conveyed above all by means of the axial end face rod projection of the rotor. The rotor-stator interactions causing the tonal interferences are therefore prevented or at least reduced.

The comb-type embodiment of these elements is geared, viewed in the peripheral direction, both to the width of the teeth and also to the radial height of the grooves. The teeth are predetermined here by an end-face end sheet, an end-face thrust plate or the cross-section of the sintered stator, generally therefore the groove shape. This thus prevents such intermediate spaces from occurring on the end faces of the stator.

The air conveyed further by the rods of the rotor during operation of the dynamoelectric rotary machine is now conveyed in a tangential or axial direction and can thus improve the cooling of the surrounding parts, such as cage ring of the rotor or the winding head of the stator.

In this way the axial thickness of the elements advantageously essentially corresponds to the axial protrusion of the rods of the rotor, in other words the distance between the inside of the cage ring and the end face of the rotor. The cage ring of the rotor is therefore at a distance in each case from the end face of the rotor on both axial sides.

The invention can naturally also be used in squirrel cage rotors, the cage rings of which rest directly against the end faces.

To facilitate assembly, these elements are structured segmentally, viewed in the peripheral direction. In this case the comb-type elements can have a few or up to twenty "forks". This depends inter alia on the number of grooves, since three to eight segments are provided in the peripheral direction.

Elements with a different "fork number" can naturally also be provided on a machine. Here only the distance of the "forks" from one another, in other words the groove distance or the tooth width, is identical.

In order to avoid flashovers between the winding coils, which leave the end face of the stator by way of the elements, these elements are preferably manufactured from insulating material.

The production of such a stator of a dynamoelectric machine is completed here by the afore-cited steps. The elements are preferably manufactured here from an elastic, preferably flexible, insulating material, which can be cut either segmentally or from a type of endless drum and can thus be adjusted to the periphery of the stator.

These elements are fastened here to the end faces of the stator, preferably by a dual-sided adhesive tape. The entire winding system is then inserted into the grooves of the stator. The subsequent impregnation and curing also results in these elements being cured. A robust surface is therefore now established on the end faces of the stator in the peripheral direction. This forms a sequence of comb-type moldings of the elements, in other words "forks" which point toward the air gap, and the exits of the winding system from the grooves. This sequence therefore represents a cylindrical attachment to the end face of the stator, which has no radial gaps and thus avoids tonal noises.

On account of the at least previously elastic elements, all intermediate spaces between the sequences of winding system observed in the peripheral direction and "forks" of the comb-type elements can be avoided by means of the suitable moldings. The subsequent curing results in this robust surface, which now avoids any tonal noise emissions.

The invention and further advantageous embodiments of the invention are explained in more detail on the basis of exemplary embodiments shown in principle.

Other features which are considered as characteristic for the invention are set forth in the appended claims.

Although the invention is illustrated and described herein as embodied in a dynamoelectric rotary machine with elements for reducing tonal noises, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
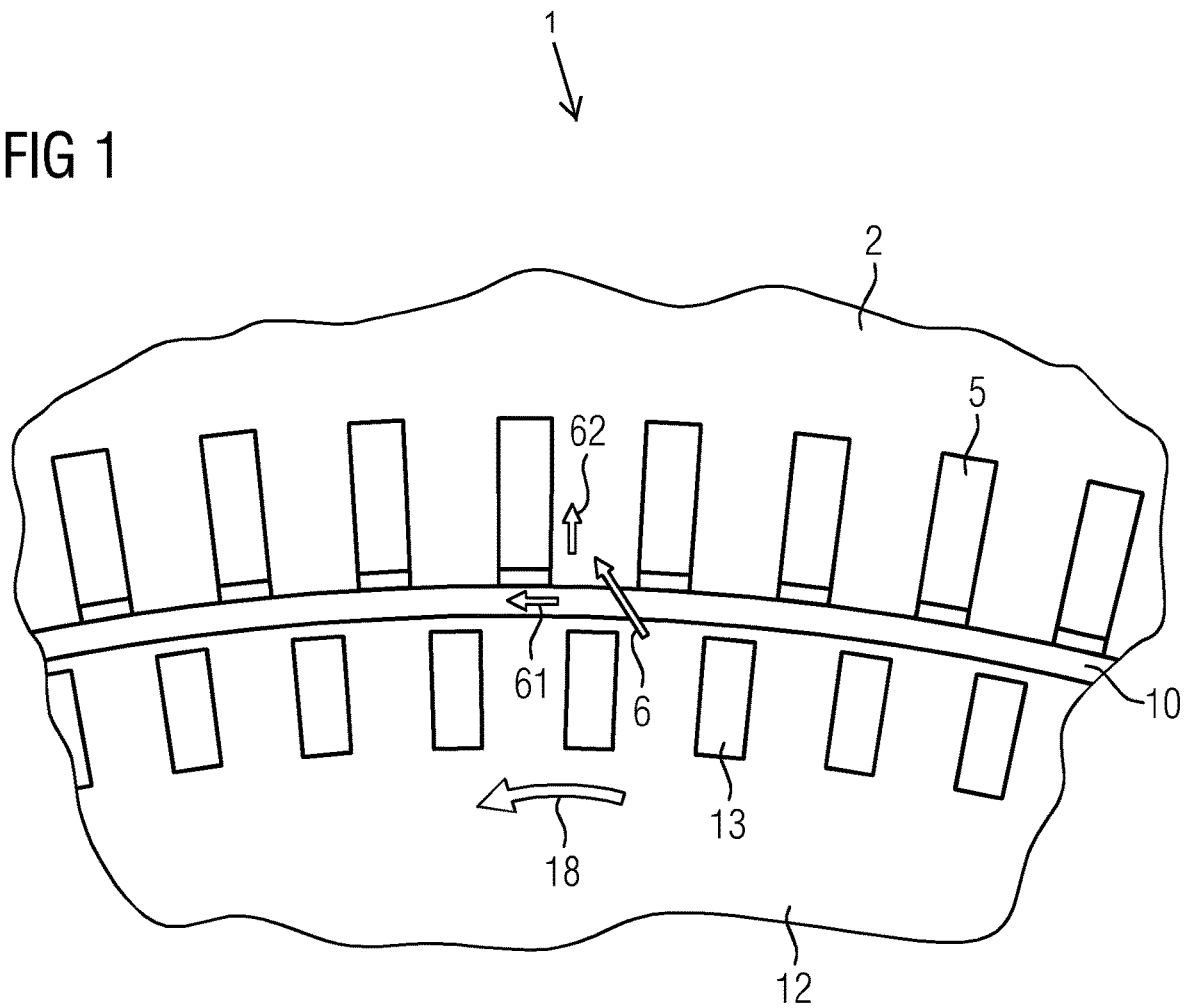
FIG. 1 is a diagrammatic, partial cross-sectional view of a dynamoelectric machine according to the invention.

Referring now to the figures of the drawings in detail and first, particularly to FIG. 1 thereof, there is shown in a partial side view, a stator 2 of a dynamoelectric machine 1, in particular an asynchronous machine and a rotor 12. The rotor 12 has conductor rods 13, which, in closed rotor grooves according to FIG. 1 or also half open rotor grooves, point to an air gap 10 in the dynamoelectric rotary machine 1. Furthermore, the rotor 12 has axially running cooling ducts 20, see FIG. 2. Arranged in the stator 2 is a winding system 5, which can be assembled for instance from toothed coils, a single-layer winding system or multi-layer winding system. The stator 2 can also have cooling ducts running axially within or on the surface of the stator 2.

During operation of the dynamoelectric machine 1, an air flow 6, which divides into a radial component 62 and a tangential component 61, takes place on account of a rotation 18 of the rotor 12 about an axis 17 (not shown). The radial component 62 normally runs on end faces of the stator 2. The tangential air flow 61 runs in the air gap 10 or along a cage ring 14 of a squirrel cage of the rotor 12. The radial component 62 of the air flow 6 now causes noises in the region of the exits of the winding system 5 on the end faces of the stator 2.

Figure 2:
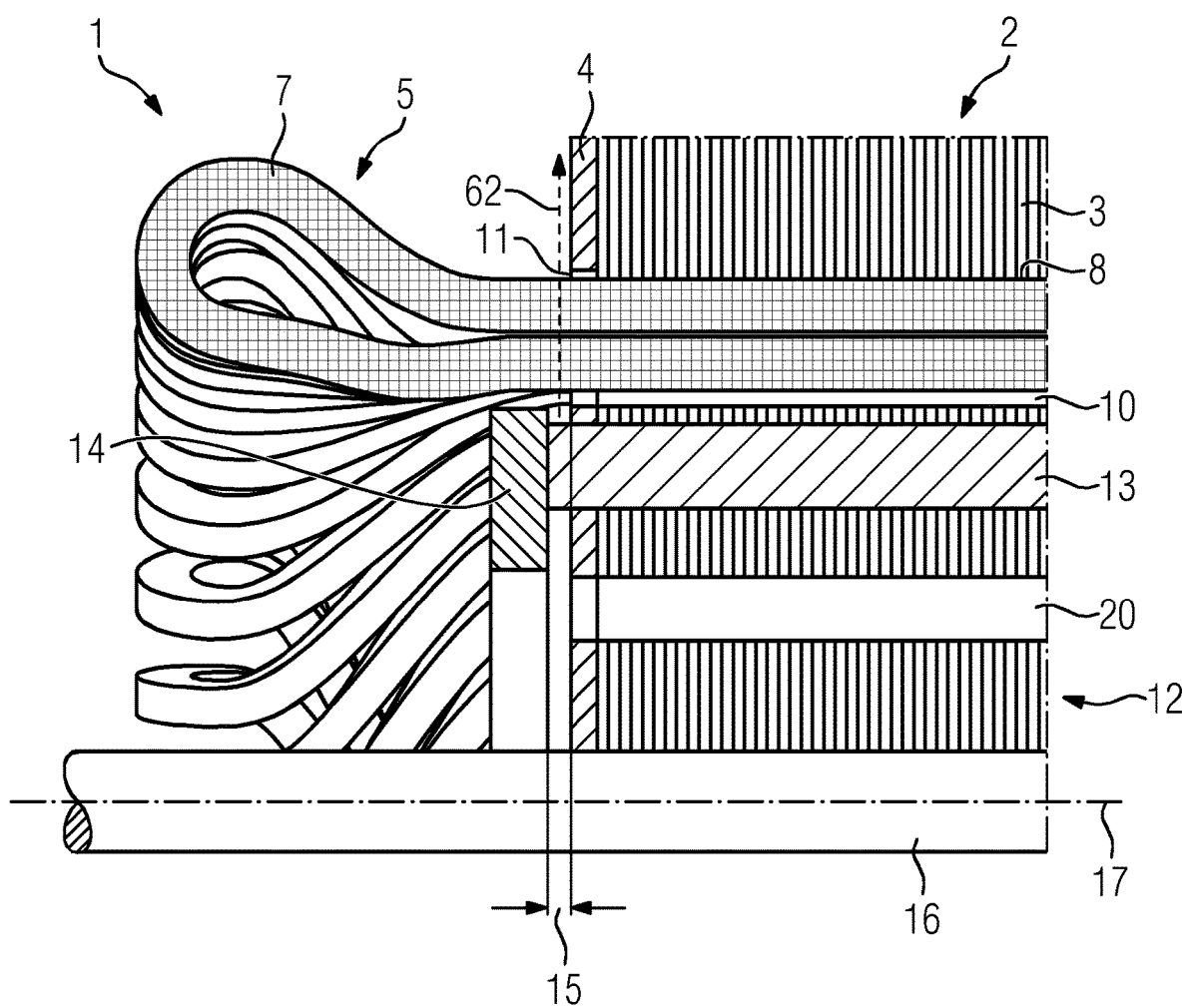
FIG. 2 is a partial longitudinal sectional view of an electric machine.

An axial distance 15 according to FIG. 2 between the cage ring 14 and the end face of the rotor 12 results in the air flow 6 in the region of the winding system 5 of the stator 2 and thus in sound emissions. On account of the inventive elements 9, in accordance with FIG. 3 the radial component 62 of the air flow 6 is now suppressed in its development.

Here the elements 9 are above all arranged in the region between the end face of the stator 2 and the axial height of the cage ring 14 of the rotor 12. The elements 9 here have an axial minimum extension, which extends axially from the end face of the stator 2 up to at least the height of the inner edge of the cage ring 14.

The magnetically conductive body of the stator 2 and rotor 12 are embodied as laminated cores of rotor 12 and stator 2 and in the present case are laminated by thrust plates 4.

Figure 3:
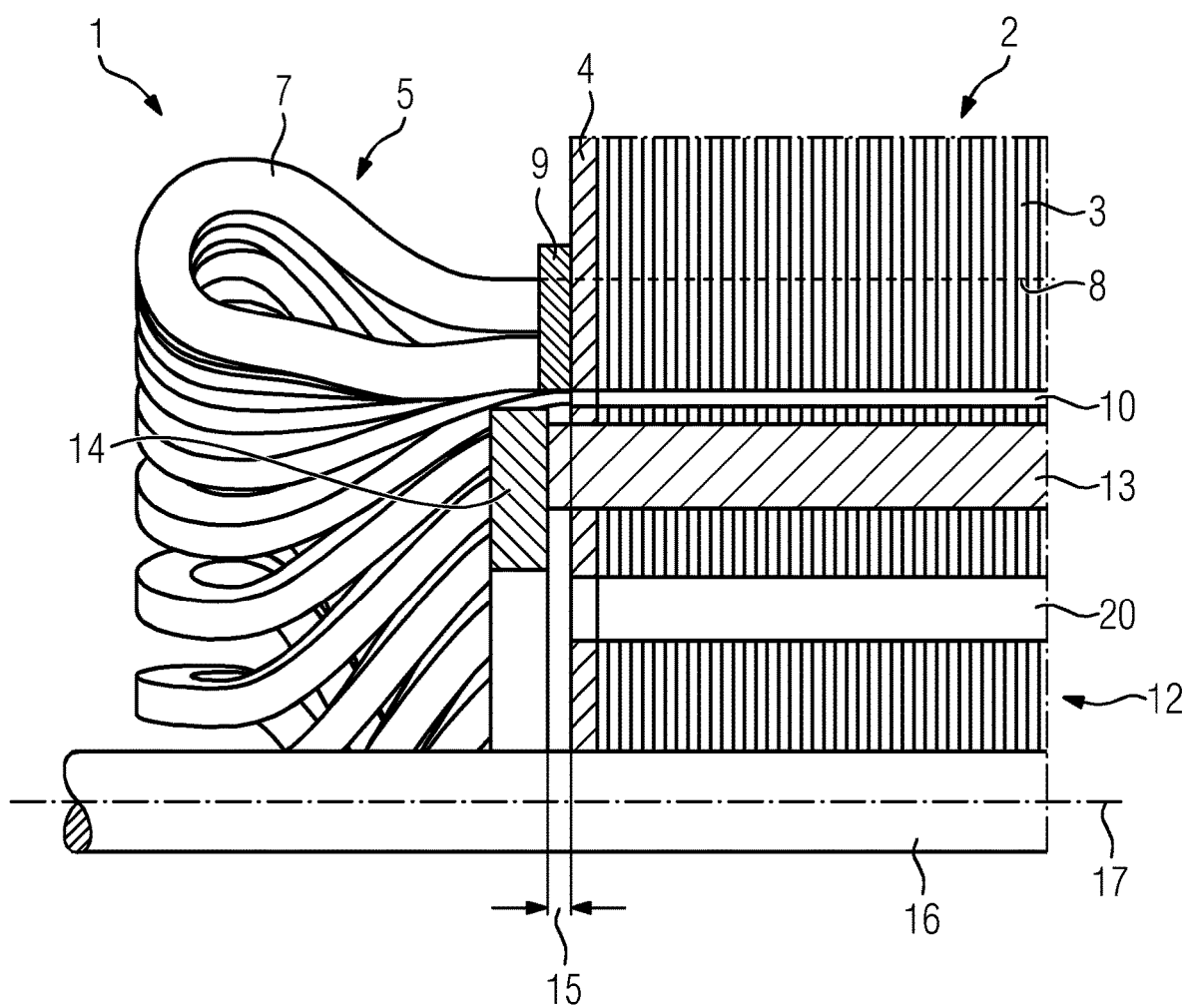
FIG. 3 is a partial longitudinal sectional view of the electric machine with elements.

Contrary to FIG. 2, FIG. 3 shows in addition elements 9 which are attached in the region between the end face of the laminated core 3 of the stator 2 and the winding head 7. In this way the previously available intermediate spaces are now closed in the region of the teeth, in other words between the axial exit of the winding coils.

Figure 4:
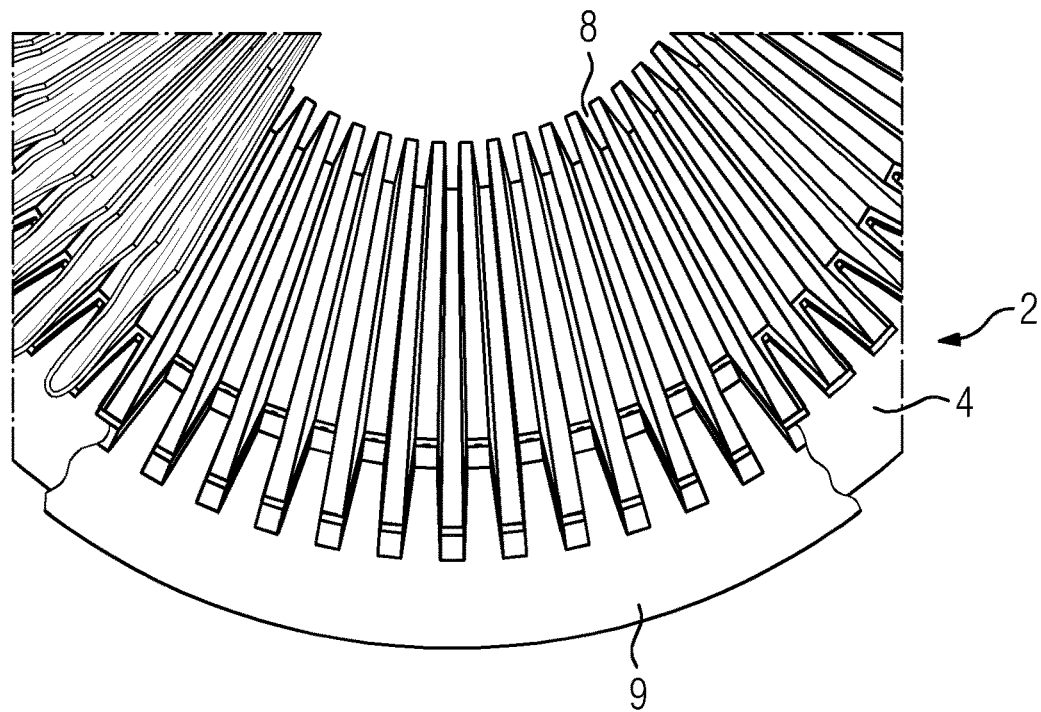
FIG. 4 is a partial perspective view of a stator.

FIG. 4 shows, in a partial perspective representation, the stator 2, which is provided on the end face with an element 9, which is positioned on the thrust plate 4. The comb-type embodiment of the element 9, in other words the shape of the "forks", is essentially geared to the cross-sectional shape of the teeth of the laminated core 3 of the stator 2 and point radially inward to the air gap 10. Furthermore, the groove box insulation for inserting the winding is set up in the left part of this representation.

Figure 5:
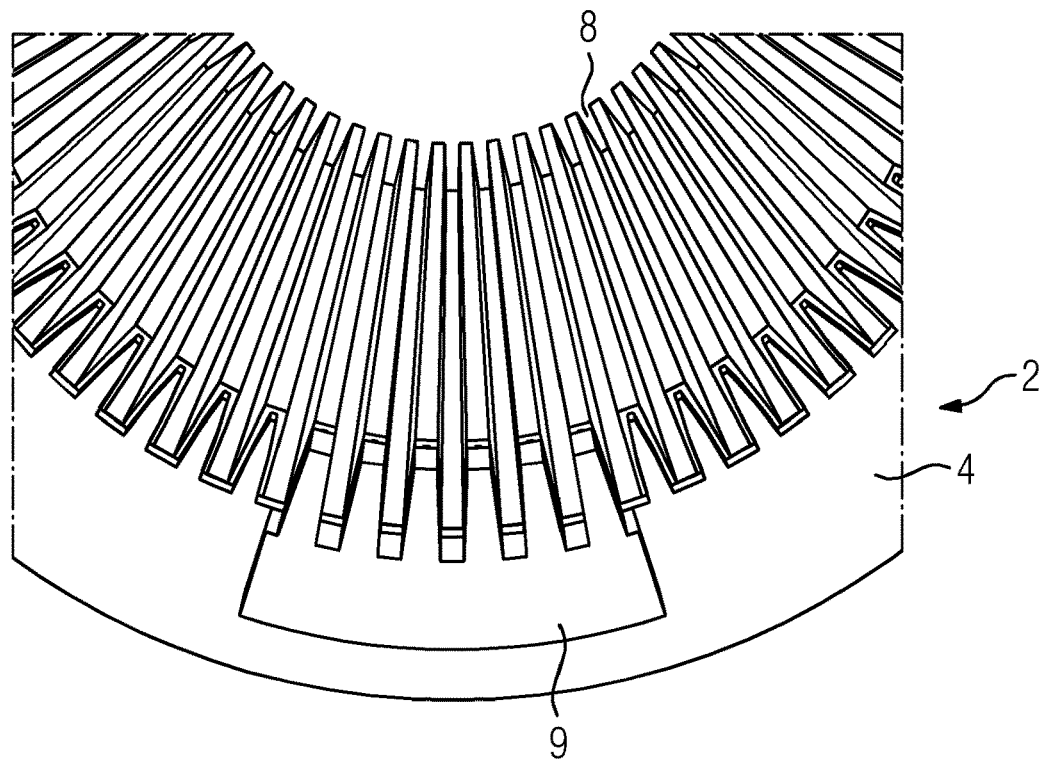
FIG. 5 is a partial perspective view of the stator.

FIG. 5 shows, in a further partial perspective representation of the stator 2, the element 9 which is embodied as a segment and which is disposed on the end face of the stator 2.

Furthermore, FIG. 4 and FIG. 5 show that these elements 9 are attached preferably by use of a dual-sided adhesive tape, immediately after providing the magnetically conductive body, in other words for instance after sintering the magnetically conductive body or the punch-packaging of the laminated core 3 of the stator 2. This takes place before the groove box insulation is inserted in the grooves 8 and the winding system 5 is in place. An impregnation and curing process is then introduced, which, inter alia, leads to reinforcing the elements 9 on the end faces of the stator 2.

Dynamoelectric machines 1 of this type are above all used in rapidly running dynamoelectric rotary machines, such as e.g. vehicles of all types, such as rail vehicles, E-cars, mining trucks etc.

The invention claimed is:
1. A dynamoelectric rotary machine, comprising:
a stator having a magnetically conductive body with grooves formed therein and teeth and a winding system disposed in said grooves, said grooves disposed between said teeth of said magnetically conductive body;
a respective winding head disposed on end faces of said stator;
a rotor having a cage ring and is disposed rotatably about an axis, and during operation of the dynamoelectric rotary machine said rotor is in electromagnetic interaction in a motor-driven or generator-driven manner with said winding system of said stator disposed in said grooves by way of an air gap formed between said rotor and said stator; and comb-type elements disposed on said end faces of said stator, and assume an extensive intermediate space between said winding system projecting from said end faces of said stator, so that tonal noises, which are produced during the operation of the dynamoelectric rotary machine, are at least reduced, said comb-type elements being structured segmentally with each segment having multiple tines, and said comb-type elements being formed from an insulating material.

2. The dynamoelectric machine according to claim 1, wherein:

said rotor has a rotor magnetically conductive body; and
said comb-type elements have an axial thickness which generally corresponds to a distance of said cage ring from an end face of said rotor magnetically conductive body.

3. The dynamoelectric machine according to claim 1, wherein when viewed in a peripheral direction, said comb-type elements on said end faces of said stator are composed in each case of several segments.

4. The dynamoelectric machine according to claim 1, wherein a shape of said teeth of said stator corresponds generally to a comb-type molding of said comb-type elements.

* * * * *